No. 872,934. PATENTED DEC. 3, 1907.
J. B. HARIG.
FISH HOOK SPREADER AND SUSPENDER.
APPLICATION FILED APR. 22, 1907.
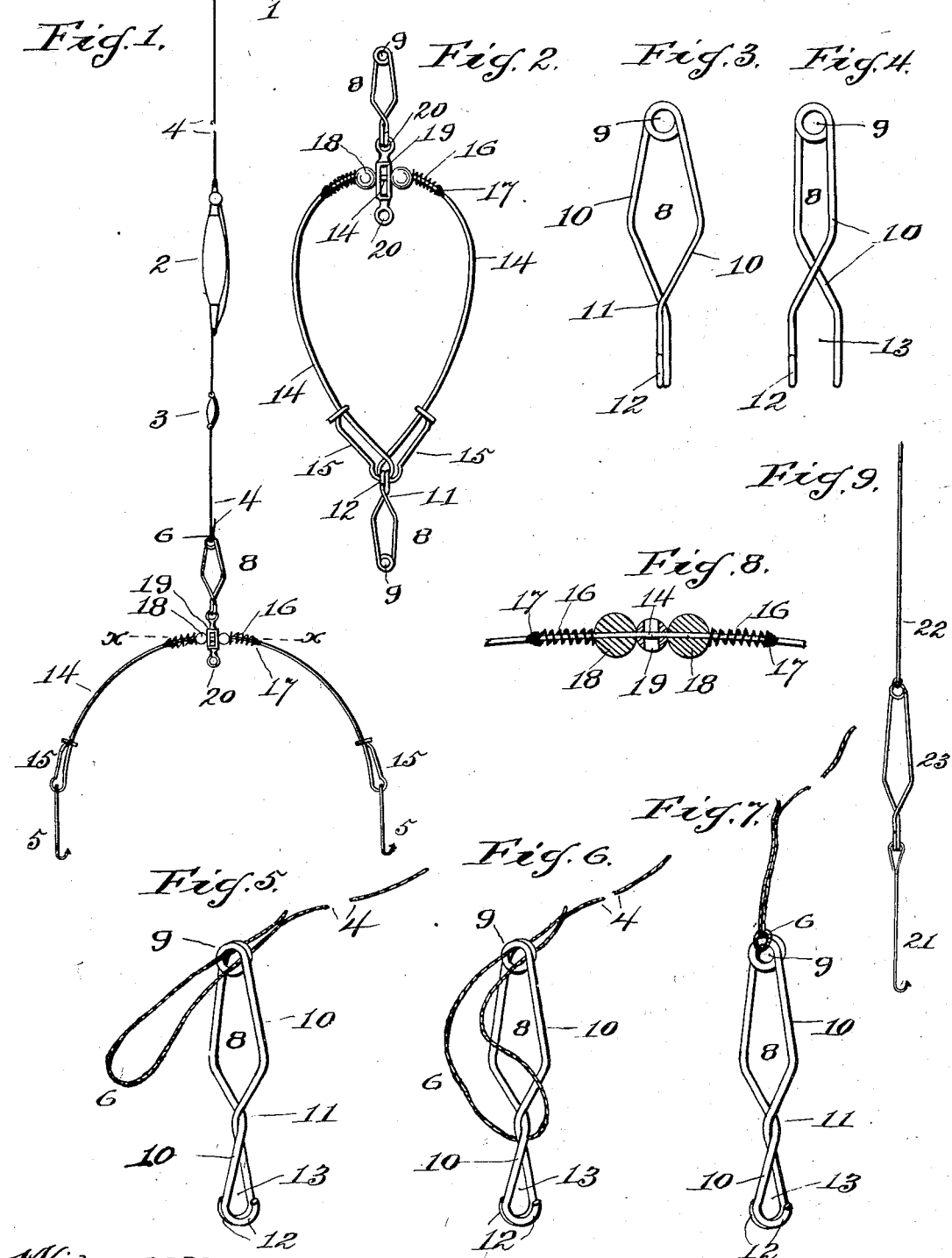
Witnesses:
Wm E. Valk Jr
W. F. Crossman
Inventor
Joseph B. Harig
By
C. F. Belt
Attorney

UNITED STATES PATENT OFFICE.

JOSEPH B. HARIG, OF BALTIMORE, MARYLAND.

FISH-HOOK SPREADER AND SUSPENDER.

No. 872,934.

Specification of Letters Patent.

Patented Dec. 3, 1907.

Application filed April 22, 1907. Serial No. 369,556.

*To all whom it may concern:*

Be it known that I, JOSEPH B. HARIG, a citizen of the United States, residing at Baltimore, in the county of Baltimore City and State of Maryland, have invented certain new and useful Improvements in Fish-Hook Spreaders and Suspenders, of which the following is a specification.

This invention relates to fishing and trapping and pertains especially to means for connecting fish-hooks to fishing lines.

The object of the invention is to provide novel and peculiar means for connecting a spreader, carrying fish-hooks, to a fishing line without knotting or tying the line to the spreader or to the fish-hooks, or to the devices as are herein employed for making such connections.

A further object of the invention is to provide a novel and peculiar spreader for suspending fish-hooks, a spring-hook arranged to permit a fishing line to be looped to the spring-hook, and a swivel connection between the spreader and the spring-hook.

As far as known to applicant fishing-hooks are attached to a line by tying the latter to the hooks, or by tying the line to a spreader having the hooks depending therefrom, which necessitates making a knot and then untying it in every instance when it is necessary or desirable to disconnect the spreader with the line, and the hook with the line. It is therefore the purpose of this invention to overcome these and various other objections and disadvantages, and to furnish means whereby such parts may be expeditiously connected and disconnected without tying and untying the line.

Various other objects, advantages and improved results are attainable in and through combination and arrangement of parts, hereinafter fully described and pointed out in the claims to follow.

In the accompanying drawings forming part of this application: Figure 1 is an elevation showing the application of the invention. Fig. 2 is an elevation showing the spreader in contracted position. Fig. 3 is an elevation of the spring-hook. Fig. 4 is a similar view showing the hook open. Figs. 5, 6 and 7 are perspective views exemplifying the manner of looping the line to the spring-hook. Fig. 8 is an enlarged detail section taken through the spreader springs and swivel. Fig. 9 is an elevation of a modification showing a fish-hook connected to a line by a spring-hook.

The same reference numerals denote the same parts throughout the several views of the drawings.

The fishing rod 1, cork or float 2, weight or sinker 3, line 4 and hooks 5 may be such as are well known and commonly used. The fishing line 4 has a loop 6 made therein.

The spring-hooks 8 being alike, only one of them will be described in detail; it consists of one piece of wire having a central circular loop-eye or coil 9, spring-arms 10 which overlap each other at 11, and terminate each in a hook 12, on a plane at right-angles or perpendicular to the coil 9, and said hooks 12 rest against each other to form a loop 13, closed at its top by the overlap 11, and opened sidewise by pressing the arms toward each other. It will be seen that by working the arms 10, the loop is opened and closed by reason of the hooks 12 being moved, not in the direction of their curve or perpendicular to the coil 9, but at right angles to their curve and in the same direction as that in which the said coil is made. The circular eye or coil 9 forms an anchor for the line-loop, and the latter is manipulated as shown in Figs. 5, 6 and 7 to effect looping and unlooping without tying the line or loop to the coil. The circular form or shape of the coil is essential to prevent accidental slipping of the line-loop from the coil onto the arms 10. Whatever element is intended to be hooked into the loop 13, the hooks are separated by pressing the arms 10, which opens the loop 13, as shown in Fig. 4 of the drawings, and such element is worked on one hook and then on the other to enter and leave the loop 13. It will be observed that the loop 13 is essential to the successful operation of the hooks for the reason that said loop permits the element in entering and leaving the loop to be slid back to the overlap 11, so as to hook or unhook such element first by one hook and then by the other.

The spreader consists of a single piece of wire 14, bowed or bent into semicircular shape and terminating in safety-hooks 15; a pair of spiral springs 16 having one end soldered or otherwise fixed to the wire at 17, and the other end left free to form a cushion bearing for a pair of follower-balls 18, which are loosely mounted on the wire 14, between the free ends of the springs 16; and a swivel-head 19 is loosely mounted on the wire between the balls and has eyes 20, to either of which the spring-hook is connected. One or both of the safety-hooks may have a spring-hook or a fish-hook attached thereto. The spring-hooks and the swivel-head constitute the connections between the line, the spreader, and the fish-hooks. The function of the springs is twofold:—they distribute the strain on the spreader wire when the latter is compressed and thereby prevent the wire from bending too suddenly at one point;—and the said springs form a cushion bearing for the follower balls, especially when the line is pulled to one side or the other from the center of the spreader and thrusts the swivel head against one of the balls.

Referring to the modification shown in Fig. 9 the spreader is dispensed with and the fish-hook 21, is connected direct to the line 22, by a spring-hook 23.

It is obvious that various combinations and details of arrangement may be resorted to, and that the size material and application of the several parts may be varied without departing from the spirit of the invention.

Having thus described my invention what I claim as new and desire to secure by Letters Patent is:

1. A fish-hook spreader and suspender comprising a semicircular wire having safety-hook terminals, a swivel-head cushioned central of the wire, and a spring-hook adapted to have a fishing line looped to one end thereof and the other end hooked to the said head.

2. A fish-hook spreader and suspender comprising a bowed wire terminating in safety-hooks, spiral-springs central of the wire, a head swiveled to the wire between the springs, a spring-hook removably secured to the head and having a coil adapted for looping a fishing-line therein, and a spring-hook carried by the safety-hooks and adapted to suspend fishing-hooks.

3. A fish-hook spreader comprising a bowed wire, a pair of spiral springs having one end secured to the wire, a pair of followers between the springs, and a head swiveled to the wire between the followers.

4. A spreader for fishing comprising a bowed wire adapted to carry fish-hooks, a pair of spiral-springs through which the wire extends and having one end of the springs fixed thereto, and a head loosely mounted on the wire between the springs and adapted to have a fishing-line connected therewith.

In witness whereof I hereunto set my hand in the presence of two witnesses.

JOSEPH B. HARIG.

Witnesses:
WM. J. NEALE,
ANDREW J. MIRKIMON.